US005497975A

United States Patent [19]
Achmad

[11] Patent Number: 5,497,975
[45] Date of Patent: Mar. 12, 1996

[54] SOLENOID PNEUMATIC VALVE

[75] Inventor: Muchlis Achmad, Santa Clarita, Calif.

[73] Assignee: HR Textron Inc., Valencia, Calif.

[21] Appl. No.: 235,759

[22] Filed: Apr. 29, 1994

[51] Int. Cl.$^6$ .............................. F16K 31/02; F16K 39/02
[52] U.S. Cl. ........................................ 251/129.07; 251/282
[58] Field of Search ....................... 251/129.07, 129.01,
251/129.02, 129.15, 284, 282

[56] References Cited

U.S. PATENT DOCUMENTS

| | | | |
|---|---|---|---|
| 3,202,182 | 8/1965 | Haviland | 251/129.07 X |
| 3,684,238 | 8/1972 | Michellone et al. | 251/129.07 X |
| 4,643,227 | 2/1987 | Suzuki et al. | 251/129.07 X |
| 4,796,854 | 1/1989 | Ewing | 251/129.07 |
| 5,143,345 | 9/1992 | Miki et al. | 251/129.02 |
| 5,251,659 | 10/1993 | Sturman et al. | 251/129.07 X |

FOREIGN PATENT DOCUMENTS 484607  7/1952  Canada .............................. 251/129.07

Primary Examiner—Martin P. Schwadron
Assistant Examiner—Kevin L. Lee
Attorney, Agent, or Firm—Robbins, Berliner & Carson

[57] ABSTRACT

A solenoid valve for use in controlling the flow of pneumatic fluid under pressure between a pair of flow ports defined by a housing. The flow of fluid is controlled by a spool disposed within a bore and is movable between first and second positions. When in one of the first and second positions, the spool blocks communication between the ports and when in the other of those positions it allows communication between the flow ports. The spool is reciprocated by a motor means which includes a core of magnetic material connected to the spool so that when the motor is energized, the spool is placed in one of its first and second positions and when the motor is de-energized, a spring moves the spool to the other of its positions.

6 Claims, 4 Drawing Sheets

SOLENOID PNEUMATIC VALVE

FIELD OF THE INVENTION

This invention relates to valves and more particularly to a solenoid valve for controlling the flow of pneumatic fluid under pressure which remains pressure balanced in the closed state thereby requiring minimal force to open the same.

BACKGROUND OF THE INVENTION

Solenoid valves are well known in the prior art. These valves take many configurations and may be proportional or on-off type valves. The present invention is directed to an on-off valve which has a minimum number of parts and is therefore simple, inexpensive and easy to construct. In the prior art, little or no attention has traditionally been given to the forces required to operate solenoid valves.

SUMMARY OF THE INVENTION

The present invention is directed to a pressure balanced solenoid valve which includes a housing defining a bore with first and second flow ports intersecting the bore. A spool is reciprocally disposed within the bore to open or close communication between the flow ports. One of the flow ports is axially aligned with the bore which houses the spool and has substantially the same diameter as the bore. The spool defines openings therethrough to provide pressure balancing of the spool when the spool blocks flow between the flow ports. The valve includes means for reciprocating the spool between the open and closed positions.

DETAILED DESCRIPTION OF THE DRAWINGS

Figure 1:
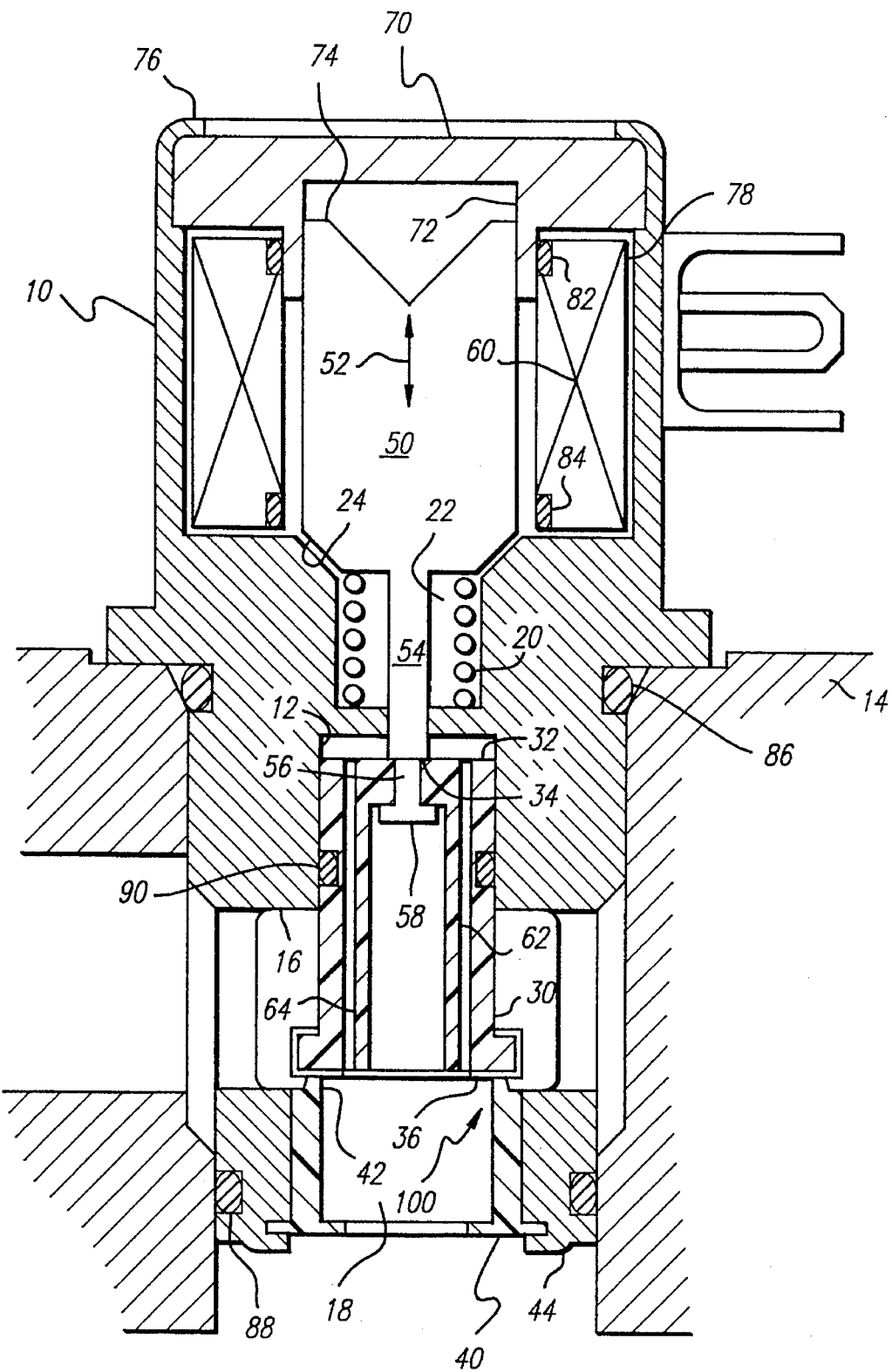
FIG. 1 is a schematic representation of a solenoid valve constructed in accordance with the principles of the present invention.

As is shown in FIG. 1 to which reference is hereby made, the solenoid valve constructed in accordance with the present invention includes a housing 10 which defines a bore 12 therein. The valve is shown disposed within a body 14 which may be a portion of an overall apparatus with which the valve of the present invention is utilized. The body 14 of the apparatus involved forms no part of the invention but is used merely to illustrate the manner in which the valve is installed. The housing 10 includes a first flow port 16 and a second flow port 18. Fluid under pressure such as a pneumatic fluid may be connected to the body 14 so as to flow from the port 18 through the valve and out the port 16 or from the port 16 through the valve and out the port 18. A spool 30 is disposed within the bore 12 for reciprocal movement between first and second positions. The spool 30 as shown in FIG. 1 is in its second position blocking communication between the flow ports 16 and 18.

As shown in FIG. 1 spring means 20 is disposed within a cavity 22 formed within the housing 10. The spring is seated in the bottom of the cavity 22 and is disposed to engage the lower surface 24 of the core 50 of the solenoid. The core 50 is moved up and down as shown by the arrow 52. When electrical energy is applied to the coils 60, the core 50 is driven in a downward direction to its second position as illustrated in FIG. 1 whereby fluid flow between the ports 16 and 18 is blocked. However, when electrical energy is removed from the coils 60 the force of the spring 20 drives the core upwardly to the open position to provide communication between the flow ports 16 and 18.

As is shown, the core 50 includes a rod 54 depending therefrom. The tip of the rod 54 passes through an opening 56 defined in the top 32 of the spool 30. The tip of the rod 54 is bent over as shown at 58 to hold the spool 30 in place. It should be noted that a shoulder 34 on the rod 54 engages the top 32 of the spool 30 to secure it properly in position with regard to the core 50. Thus, as the core 50 moves up and down as shown by the arrow 52 the spool 30 is caused to reciprocate within the bore 12.

Press fitted within the flow port 18 is a member 40 defining a valve seat 42. The lower end 36 of the spool 30 engages the valve seat 42 when electrical energy is applied to the coil 60 causing the core to move downwardly into position as shown in FIG. 1. In this position as above described, communication between the flow ports 16 and 18 is blocked by the spool 30. To hold the member 40 in place, the lower edges 44 of the housing are rolled over as shown after the member 40 has been press fitted into place within the opening defining the flow port 18.

As is shown in FIG. 1 the housing 10 is closed at its upper end by a cap 70 which defines a recess 72 therein. The upper portion 74 of the core 50 is disposed within the recess 72 and is used to maintain the core and spool assembly in alignment within the housing 10. As is illustrated, the rim 76 of the housing 10 is rolled over to hold the cap 70 in place. The cap 70 rests against a shoulder 78 formed on the inner surface of the housing 10.

To preclude fluid leakage at various points within the valve there are provided packing or O-rings as well known to those skilled in the art such as shown at 82, 84, 86 and 88.

To maintain the cost of the solenoid valve constructed in accordance with the present invention at a minimum, the spool 30 is preferrably made of molded plastic material. When such is utilized it is preferable that the member 40 be made of stainless steel so that the seat 42 will be hard and will form a good seal with the lower end 36 of spool 30. It should however be recognized by those skilled in the art that if desired the spool 30 may be made of metal. If such is done then preferrably the member 40 would be constructed of molded plastic. Under those circumstances the end 36 of the spool 30 would be coated with a rubber cap material such as shown at 100. The rubber cap would then provide the desired sealing capability.

In accordance with a critical element of the present invention the valve is pressure balanced so that a minimal amount of force is required to move the spool from one of its two positions to the other. As is illustrated in FIG. 1 the spool 30 defines openings 62 and 64 therethrough to provide pressure equalization across the spool 30. The number of through openings may be any desired depending upon the particular application. The major factor for consideration is that there be a sufficient opening to prevent the formation across the spool 30 of a differential pressure sufficient to preclude ready movement of the valve from its closed position as shown to its open position under the force of the spring means 20. That is, any pneumatic fluid residing between the top 32 of the spool 30 and the closed end of the bore 12 must be able to pass through the openings 62–64 without restricting movement of the spool 30. In order also to obtain the desired pressure balance the diameter of the flow port 18 as defined by the inner diameter of the member 40 must be substantially equal to the diameter of the bore 12 within which the spool 30 reciprocates. By establishing these dimensions, the amount of force appearing across both ends of the spool 30 when the pneumatic fluid under pressure is applied to the bore 18, will be equal. As a result, when the electrical energy is removed from the coil 60 the spring 20 can immediately cause the core 50 and with it the spool 30 to move from the closed position as shown to the open position thus permitting fluid to flow inwardly from the port 18 through the port 16 outwardly for the desired application.

On the other hand if the pneumatic fluid under pressure is applied to the port 16, the area for application of pressure to the spool 30 again is defined by the diameter of the seat and the diameter of the bore 12 as above described. By reference to FIG. 1 it will be noted that since those diameters are equal, the forces generated on the spool 30 by fluid under pressure being present at the flow port 16 and surrounding the spool 30 would be equal on all sides therefore minimizing the forces required to move the core 50 and with it the spool 30 from the closed to the open position.

In order to preclude leakage around the exterior of the spool 30 along the inner diameter of the bore 12, one or more piston rings 90 are seated within grooves around the exterior of the spool 30. The piston rings provide a sliding seal with the inner surface of the bore 12.

Figure 2:
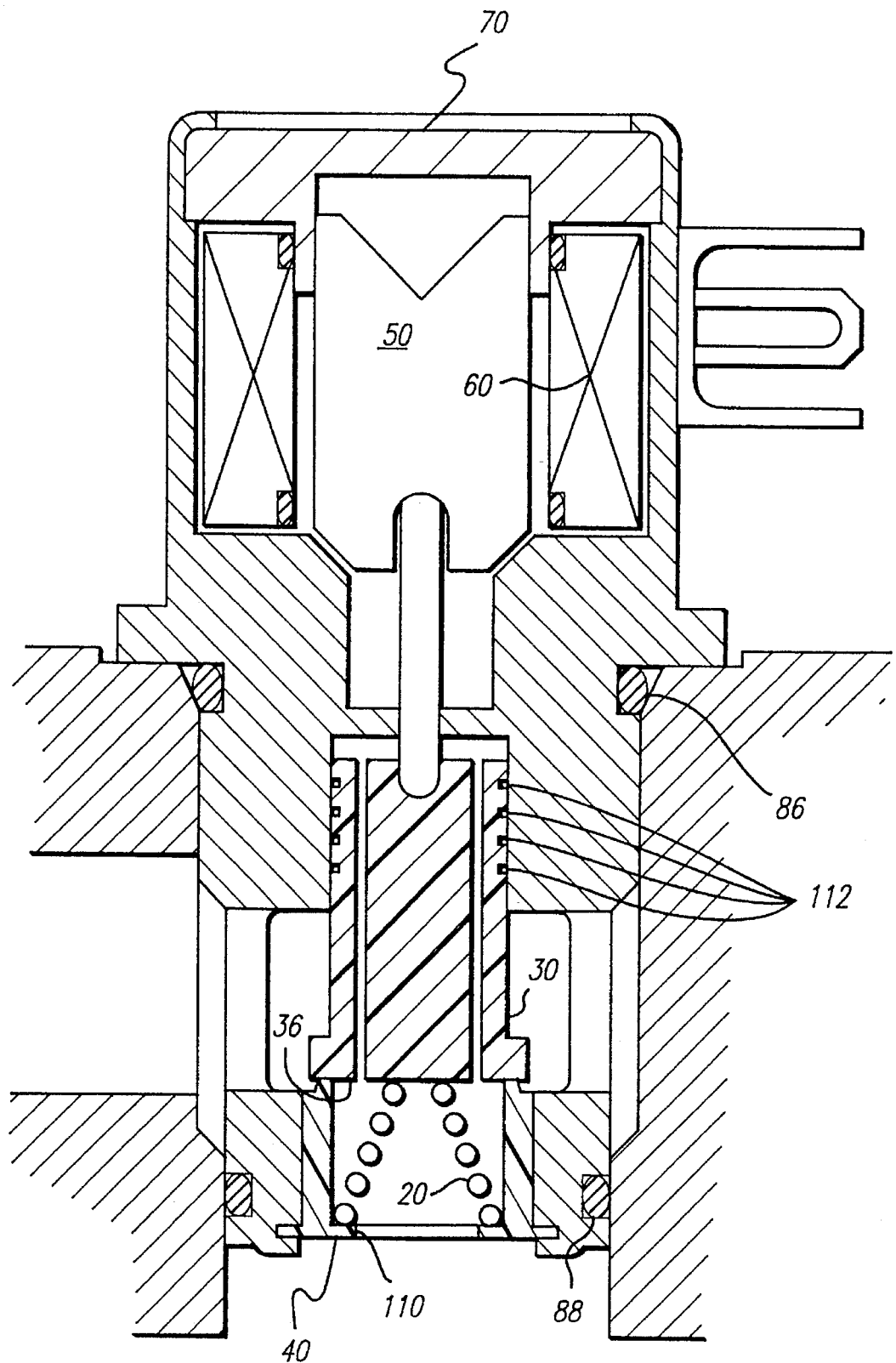
FIG. 2 is a schematic representation of an alternative embodiment of a solenoid valve constructed in accordance with the present invention.

Referring now more particularly to FIG. 2, it will be noted that the structure of the valve shown therein is substantially identical to the structure of the valve illustrated in FIG. 1. The principal changes in the structure is that the spring means 20 has been moved from engagement with the core 50 as in FIG. 1 so that it is held in place between a shoulder 110 and the lower surface 36 of the spool 30'. Furthermore as illustrated in FIG. 2 the spool 30' includes a plurality of piston rings as shown at 112. Also the connection between the core 50' (FIG. 2) and the spool 30' is modified to a push rod type of construction in view of the utilization of the repositioned spring 20'. Otherwise the configuration and operation of the solenoid valve as shown in FIG. 2 is identical to that as illustrated and described with respect to FIG. 1.

Figure 3:
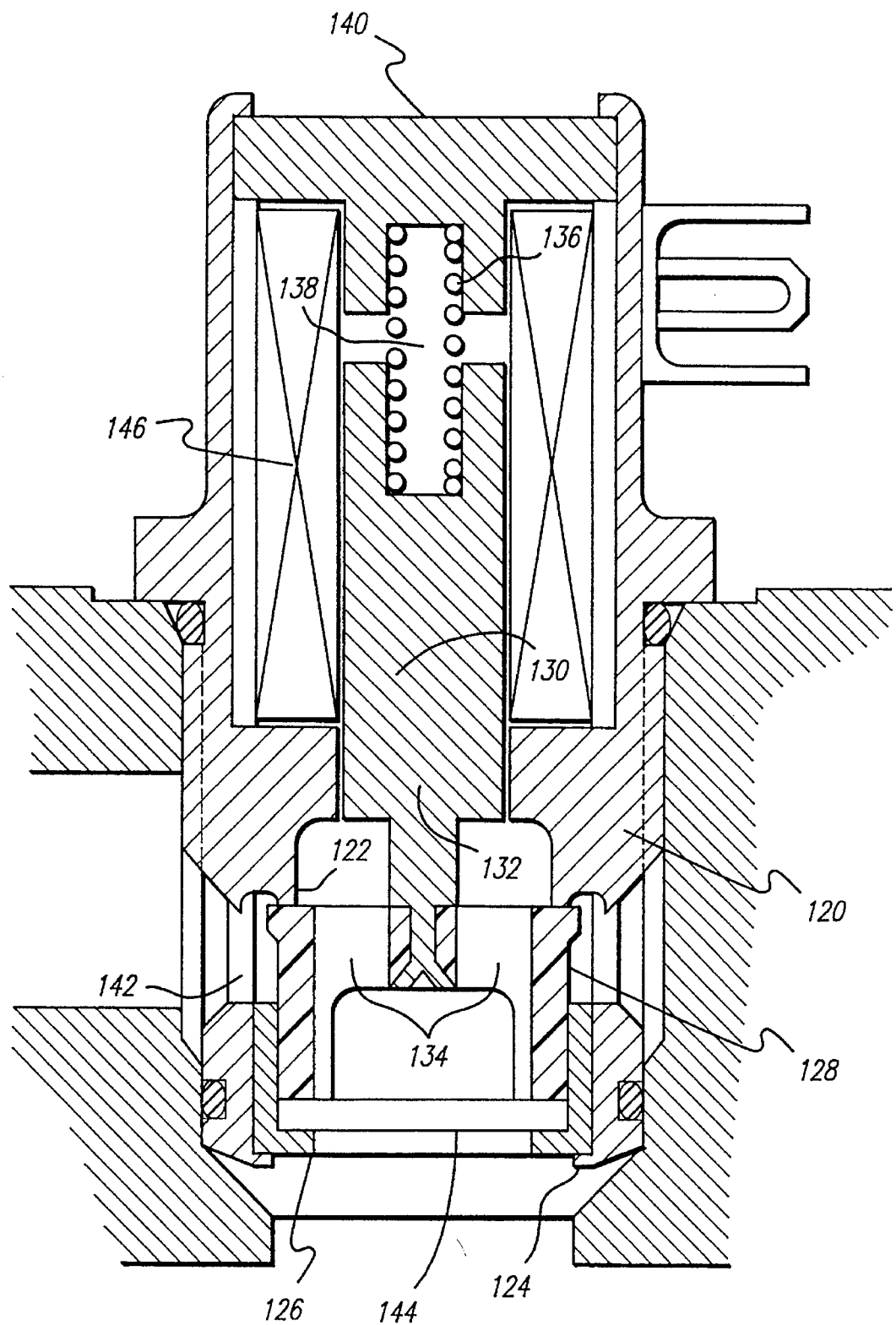
FIG. 3 is yet another schematic representation of a further embodiment of a solenoid valve constructed in accordance with the principles of the present invention.

Referring now more particularly to FIG. 3 there is shown an alternative embodiment of a pneumatic pressure balanced solenoid valve constructed in accordance with the principles of the present invention. Although the structure as shown in FIG. 3 is somewhat similar to that shown in FIGS. 1 and 2 it will be recognized that the solenoid valve of FIG. 3 is a pull type solenoid while that in FIGS. 1 and 2 represented a push type solenoid. That is, in FIG. 3 when the coils have electrical energy applied thereto the spool or poppet is pulled into a closed position while in that of FIGS. 1 and 2 the spool or poppet is pushed by energizing the solenoid coils into the closed position.

As is illustrated in FIG. 3, the housing 120 defines a bore 122 which extends outwardly through the bottom 124 of the housing. A sleeve 126 is fitted into the bore 122 and receives a spool 128 which reciprocates within the extension of the bore 122 as provided by the internal diameter of the sleeve 126. It will be recognized that the diameter of the bore 122 and the internal diameter of the sleeve 126 are substantially identical. The core 130 of the solenoid includes a downwardly extending arm 132 which is connected to the spool 128 in the same manner as above described with reference of FIG. 1. As is evident from the illustration in FIG. 3 the spool defines a plurality of openings 134 therethrough to provide appropriate pressure balancing of the spool 128. The spring means 136 is captured within a recess 138 provided in the core 130 and extends upwardly into a similar recess provided in the cap 140. Thus, the spring means 136 is continuously urging the spool 128 in a downward or open direction to provide communication between the flow ports 142 and 144. When the coil 146 has electrical energy applied thereto the solenoid is energized and the spool moves to the position as shown in FIG. 3.

Figure 4:
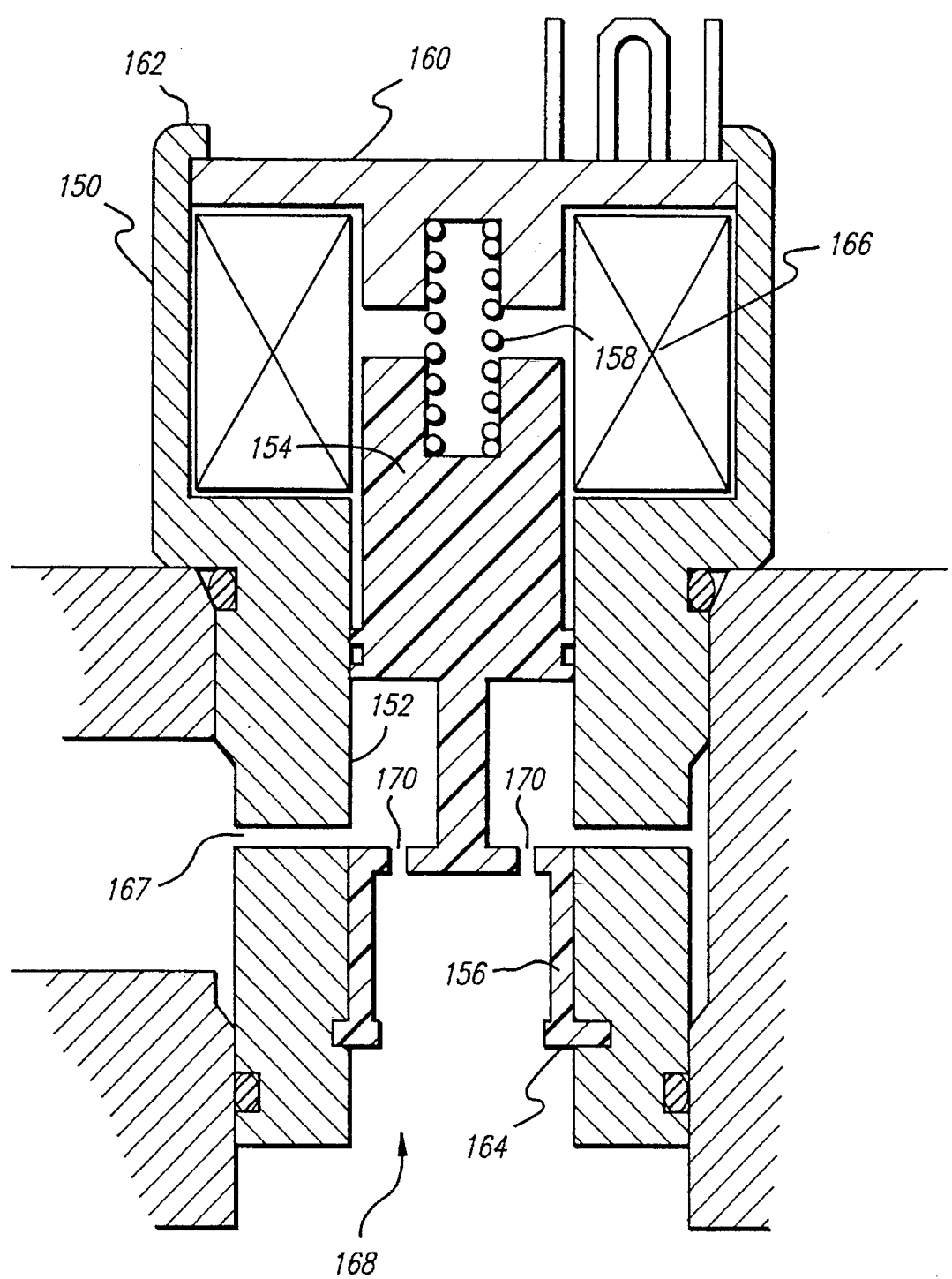
FIG. 4 is a schematic representation of a further alternative embodiment of such a valve.

Referring now more particularly to FIG. 4, the most simplified of all of the alternative embodiments of the pneumatic pressure balanced solenoid valve is illustrated. The primary difference between the solenoid as illustrated in FIG. 4 and the remaining solenoids is that the spool and the core are all constructed of a single member thereby reducing the number of parts for the solenoid valve to the minimum possible.

As is illustrated in FIG. 4 the housing 150 defines a bore 152 within which there is positioned a member 154 which includes the combination of the core and the spool, the spool per se is designated 156 and the core per se as 157. As is illustrated, a spring means 158 is disposed between the member 154 and the cap 160 which is held in place by crimping the top portion or rim of the housing as shown at 162. A circular locking ring 164 is positioned within the bore 152 at the bottom portion thereof and is used to limit the downward travel of the spool 156 to the position as shown. Such downward travel is accomplished by way of the spring 158 when electrical energy is not applied to the coil 166. When such electrical energy is applied, the member 154 and with it the spool 156 moves upwardly to block the flow of fluid between the flow ports 167 and 168. As noted, there is a plurality of openings 170 in the spool 156 to provide pressure balancing thereby reducing the force required to move the member 154 and spool 156 between its respective open and closed flow positions. O-rings 188 or similar seals are also provided.

It will be recognized by those skilled in the art that each of the embodiments illustrated herein are of the normally open variety. However, by reversing the spring and energized coil functions each of the valves may constructed to be of the normally closed variety without departing from the spirit of the invention.

What is claimed is:

1. A pressure balanced solenoid valve comprising:
   (a) a housing having an inner surface defining a bore therein and first and second flow ports intersecting said bore said housing inner surface defining a groove therein;
   (b) a spool reciprocally disposed within said bore for movement between first and second positions, said spool establishing communication between said first and second flow ports when in said first position and blocking communication therebetween when in said second position;
   (c) a ring received within said groove and extending into said bore for limiting travel of said spool to a predetermined position;
   (d) one of said first and second flow ports being aligned with an having substantially the same diameter as said bore;

(e) said spool defining an opening therethrough for pressure balancing said spool when said spool is in said second position;

(f) means for reciprocating said spool between said first and second positions including motor means having a core of magnetic material, said spool and said core being constructed of a unitary member, said motor means when energized by an electrical signal moves said spool ton one of said first and second positions, and spring means continuously urging said spool to the other position.

2. A pressure balanced solenoid valve comprising:

(a) a housing defining a bore therein having an inner diameter and first and second flow ports intersecting said bore, one of said first and second flow ports being aligned with and having substantially the same diameter as said bore;

(b) a molded plastic spool reciprocally disposed within said bore for movement between first and second positions, said spool establishing communication between said first and second flow ports when in said first position and blocking communication therebetween when in said second position;

(c) corrosive resistant metal sleeve means defining a valve seat for engagement by said spool when said spool is in said second position, said sleeve means being received within said aligned flow port and defining an inner diameter which is substantially equal to the inner diameter of said bore;

(d) said spool defining an opening therethrough for pressure balancing said spool when said spool is in said second position; and (e) means for reciprocating said spool between said first and second positions.

3. A solenoid valve as defined in claim 2 wherein said means for reciprocating said spool includes motor means comprising a coil and a core of magnetic material, said core including a downwardly extending arm means affixed to said spool, and spring means disposed between said core and said housing for continuously urging said spool toward one of said first and second positions, said motor upon being electrically energized moving said spool means to said other position.

4. A solenoid valve as defined in claim 3 wherein said sleeve is retained in position by rolling over a portion of said housing within which said sleeve is disposed.

5. A solenoid valve as defined in claim 4 wherein said housing is closed by a cap means, said cap means being retained in position by rolling over a rim of said housing.

6. A solenoid valve as defined in claim 3 wherein said molded plastic spool includes piston rings mounted therein for engagement with said bore for limiting fluid leakage between said bore and said spool.

\* \* \* \* \*